United States Patent
Marchant et al.

(10) Patent No.: US 6,279,508 B1
(45) Date of Patent: Aug. 28, 2001

(54) PET WATERING FOUNTAIN

(76) Inventors: Jack Marchant; Emily Marchant, both of 139 Green Acres Rd., Harleyville, SC (US) 29448

( * ) Notice: Subject to any disclaimer, the term of this patent is extended or adjusted under 35 U.S.C. 154(b) by 0 days.

(21) Appl. No.: 09/559,540

(22) Filed: Apr. 28, 2000

Related U.S. Application Data

(60) Provisional application No. 60/162,066, filed on Oct. 28, 1999.

(51) Int. Cl.[7] .................................................. A01K 7/06
(52) U.S. Cl. ............................ 119/75; 119/76; 119/62
(58) Field of Search .................... 119/75, 52.4, 53.5, 119/54, 55, 62, 76; 25/295; 4/624, 626; 239/29.5

(56) References Cited

U.S. PATENT DOCUMENTS

| | | |
|---|---|---|
| D. 374,516 | 10/1996 | Lillelund et al. . |
| 1,539,740 * | 5/1925 | Johnson . |
| 2,688,310 * | 9/1954 | Backus . |
| 3,133,524 | 5/1964 | Martin . |
| 3,197,081 | 7/1965 | Midworth . |
| 3,272,181 * | 9/1966 | Ramsey . |
| 3,418,977 | 12/1968 | Godshalk . |
| 3,507,255 | 4/1970 | Allen . |
| 3,831,558 | 8/1974 | Forbes . |
| 3,889,640 | 6/1975 | Restall . |
| 4,117,555 * | 10/1978 | Dennis ................................. 119/163 |
| 4,329,941 | 5/1982 | Niki . |
| 4,469,049 * | 9/1984 | Waynick ................................ 119/76 |
| 4,633,816 | 1/1987 | Ove et al. . |
| 4,729,414 * | 3/1988 | Beber ................................... 141/250 |
| 4,765,003 * | 8/1988 | Chang ..................................... 4/624 |
| 4,813,378 | 3/1989 | Lapp . |
| 4,924,812 * | 5/1990 | Bernays, Jr. .......................... 119/76 |
| 5,125,623 | 6/1992 | Kiedinger . |
| 5,582,132 | 12/1996 | Morton . |

\* cited by examiner

Primary Examiner—Peter M. Poon
Assistant Examiner—Yvonne R. Abbott
(74) Attorney, Agent, or Firm—Richard C. Litman

(57) ABSTRACT

A pet watering fountain including a box-shaped housing, a water supplyer, a hose, two pipes, a control valve unit (body), a helical or expansion spring (spring), a bowl, a drain, and a pedal. A thirsty dog walks onto the spring-biased pedal. The spring-biased pedal is then lowered to the floor of the housing which actuates a lever on the control valve unit. As a result, water flows from an outside hose bib into a garden hose, through a first pipe into a valve unit, then into a second pipe which fills into an elevated bowl.

10 Claims, 2 Drawing Sheets

PET WATERING FOUNTAIN

CROSS-REFERENCE TO RELATED APPLICATION

This application claims the benefit of U.S. Provisional Patent Application Ser. No. 60/162,066, filed Oct. 28, 1999.

BACKGROUND OF THE INVENTION

1. Field of the Invention

The present invention relates to a pet watering fountain, and more specifically, a pet watering fountain which is activated by the pet stepping on a spring-biased pedal.

2. Description of Related Art

Providing an animal with a constant source of fresh water in the back yard has been the subject matter of patents for many decades. The following patent illustrates an ornamental design of a water dispenser. Des. Pat. No. 374,516, issued to Lillelund on Oct. 8, 1996, describes an automatic water dispenser for animals. The ornamental design for the water dispenser is a double-recessed bowl with a water jug inverted into one of the recesses.

The following patents describes different types of watering devices for both people and animals. U.S. Pat. No. 3,133,524, issued to Perry S. Martin on May 19, 1964, describes an automatic stock watering fountain. The device includes a pipe which extends into the ground to a water riser leading from an underground water main. A control valve determines the amount of water flowing into a bowl which is connected to the above ground pipe.

U.S. Pat. No. 3,197,081, issued to Graham E. Midworth on Jul. 27, 1965, describes a dispenser having a pressure actuated outlet means. The device is operated by hydraulic pressure from a subsidiary unit at a different location. U.S. Pat. No. 3,418,977, issued to James B. Yardley on Dec. 31, 1968, describes a poultry watering device. The device includes a valve body member insertable through a port in a conduit.

U.S. Pat. No. 3,507,255, issued to Maurice B. Allen on Apr. 21, 1970, describes an animal-actuated drinking valve with a float. The device includes a valve assembly comprising substantially two cylindrical body parts which are removably connected to each other. U.S. Pat. No. 3,831,558, issued to Alden O. Forbes on Aug. 27, 1974, describes a water fountain for animals. The device includes a water basin supported by a stanchion. A water conduit is connected to a water source and intake valves. An animal depresses a valve actuator lever disposed within the water basin.

U.S. Pat. No. 3,889,640, issued to George Restall on Jun. 17, 1975, describes an animal operated liquid dispenser. The device includes a body member having an aperture through which liquids flows. The aperture is closed by a valve which is actuated by a spring mounted on the body member. U.S. Pat. No. 4,329,941, issued to Motohiro Niki on May 18, 1982, describes a water dispenser for small animals. The device comprises a casing, a water supply means, a valve for controlling water flow, and a water feed tube. When the valve is nudged and moved at its downstream end, the poppet valve opens to permit water from the water supply means to flow into the feed tube.

U.S. Pat. No. 4,813,378, issued to Alvin K. Lapp on Mar. 21, 1989, describes an animal watering fountain. The device includes intake and shut-off valves which are below ground to prevent freezing of the lines. U.S. Pat. No. 4,633,816, issued to Ove et. al. on Jan. 6, 1987, describes a device for the controlled discharge of a liquid to animals. The device includes a valve which has an actuated member connected to a main closing valve.

U.S. Pat. No. 5,125,623, issued to Robert Kiedinger on Jun. 30, 1992, describes a tap water control apparatus comprising a single spout of a plumbing system. The spout receives tap water from valves that adjust flow rates from separate lines of hot and cold water utilized by a control valve. U.S. Pat. No. 5,207,182, issued to Moises B. Lorenzana on May 4, 1993, describes an animal watering apparatus. The device includes a central water receiving portion which is surrounded by a funnel-shaped portion designed to return splashed water back to the central portion.

U.S. Pat. No. 5,582,132, issued to Dale J. Morton on Dec. 10, 1996, describes an automatic pet watering device. The device includes a reservoir, a removable water container, a water supply hose, and a valve. The floating valve actuates the water flow when the water level in the reservoir decreases in volume. An ideal pet watering fountain would easily be attachable to an outside hose bib and at the same time incorporate a lengthy garden hose for placing the invention anywhere in the yard.

None of the above inventions and patents, taken either singly or in combination, is seen to describe the instant invention as claimed.

SUMMARY OF THE INVENTION

The pet watering fountain includes a box-shaped housing which comprises two vertical side walls, a front vertical wall, a rear vertical wall, a horizontal floor, and a top horizontal wall. The pet watering fountain also includes a first plumbing pipe (first pipe), a second plumbing pipe (second pipe), a garden hose, a water supplying means, a valve unit, a spring, a bowl, a draining means, and a pedal.

The operation of the pet watering fountain is quite simple. Water is dispensed into the bowl by hydraulic pressure which is actuated by a spring-biased pedal and lever mechanism attached to a valve unit.

Accordingly, it is a principal object of the invention to provide a pet watering fountain that is easily adapted to an outside hose bib.

It is another object of the invention to provide a pet watering device that utilizes a standard flexible garden hose to permit the present invention to be placed at any convenient location in the back yard.

It is a further objection of the invention to provide a pet watering fountain that can be easily dismantled and assembled without any skill or tools for cleaning and repair.

Still another object of the invention is to accommodate the various weights and sizes of animals.

It is an object of the invention to provide improved elements and arrangements thereof a pet watering fountain in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

Figure 1:
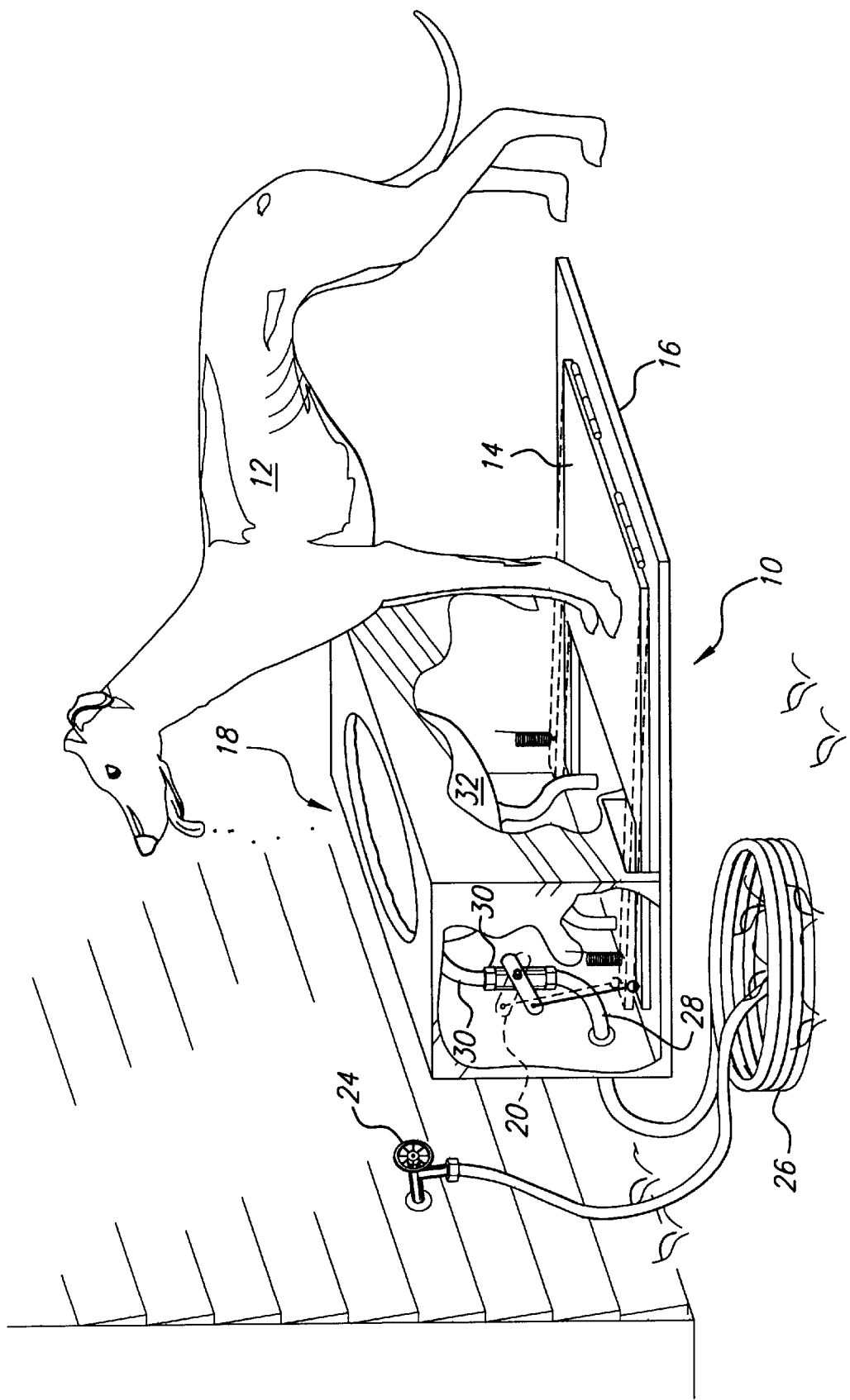
FIG. 1 is an environmental, perspective view of the pet watering fountain according to the present invention.

The present invention is a pet watering fountain designated as 10 in the drawings. The pet watering fountain 10 includes a box shaped housing, a water supply means, a hose, at least two pipes, a control valve unit (body), a helical or tension spring (spring), a bowl, a draining means, a stopping means for drain, several fastening means, and a pedal.

FIG. 1 illustrates the operation of the pet watering fountain 10. First, a thirsty dog 12 walks onto the spring-biased pedal 14. The spring-biased pedal 14 is then lowered to the floor 16 of the housing 18 which actuates a lever 20 on the control valve unit 22. As a result, water flows from an outside hose bib 24 into a garden hose 26, through a first pipe 28 into a valve unit 22, then into a second pipe 30 which fills into an elevated bowl 32.

Figure 2:
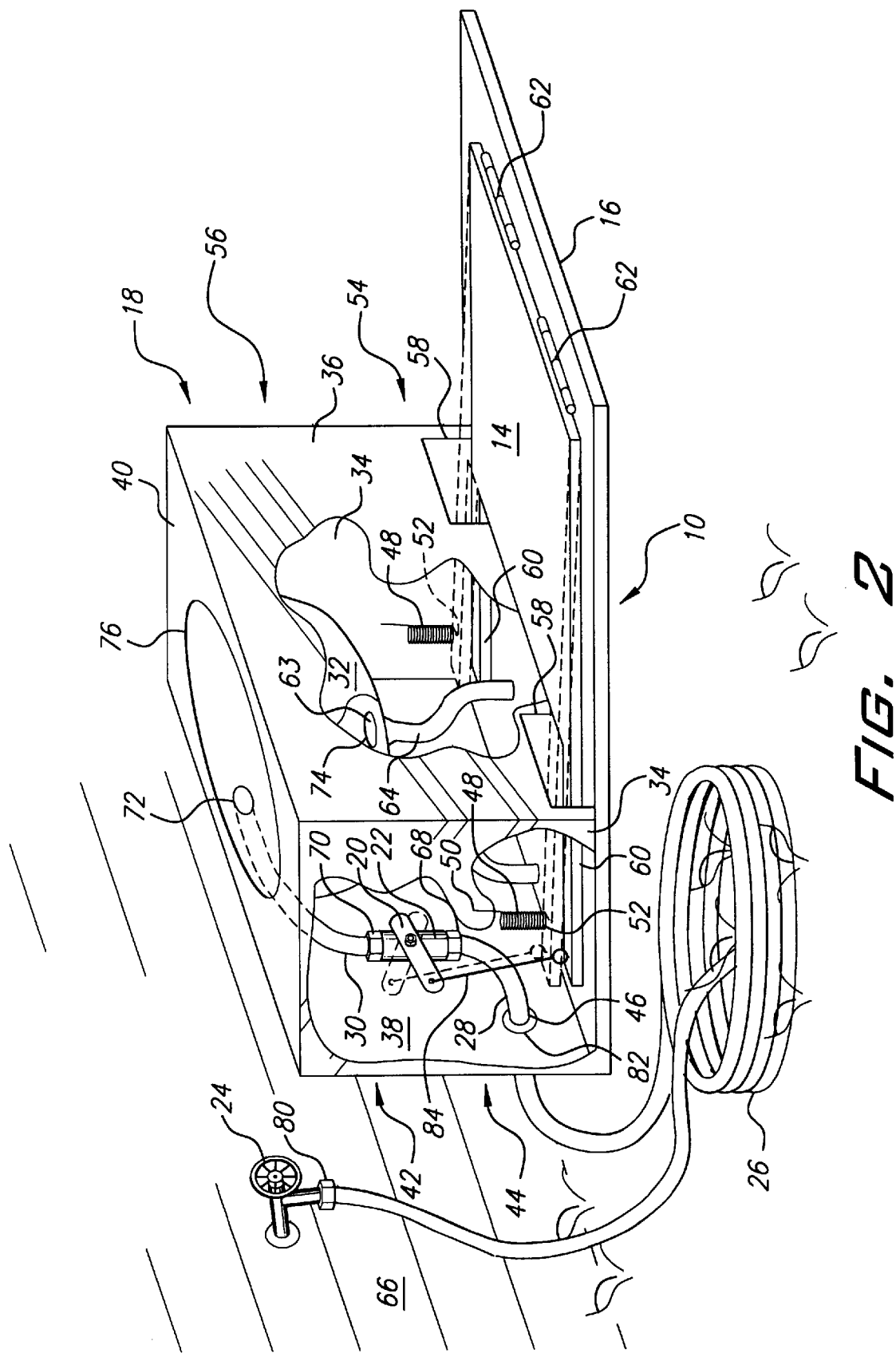
FIG. 2 is a perspective view of the pet watering fountain of the present invention.

FIG. 2 illustrates the operation of the pet watering fountain 10 and how the invention is assembled. The pet watering fountain 10 includes a box-shaped housing 18 which comprises two vertical side walls 34, a front vertical wall 36, a rear vertical wall 38, a horizontal floor 16, and a top horizontal wall 40. The rear vertical wall 38 comprising an upper 42 and lower 44 portion. The lower portion 44 of the rear vertical wall 38 includes an opening 46 dimensioned and configured to receive the end of a conventional garden hose 26 and the end of the first plumbing pipe 28.

The springs 48 have an upper 50 and lower 52 end and is attached to each vertical side wall 34. The center of each vertical side wall 34 includes an opening dimensioned and configured to receive a fastening means such as a nut, bolt and washer (not shown) for attaching the upper end 50 of the spring 48. The front vertical wall 36 comprises a lower 54 and upper 56 portion. The lower portion 54 of the front vertical wall 36 includes two openings 58 each dimensioned and configured to receive a flange 60 extension of the pedal 14. The front vertical wall 36 is detachable from the box-shaped housing 18.

The center of the top horizontal wall 40 comprises an opening dimensioned and configured to receive a bowl 32. At least two thirds of one side of the floor 16 of the box-shaped housing 18 extends outwards. The floor 16 comprises an opening dimensioned and configured to receive a hinge means 62 which is also attached to the end of the spring-biased pedal 14. The floor 16 may contain an opening dimensioned and configured to receive the draining means 64.

The pet watering fountain 10 also includes a first plumbing pipe 28 (first pipe), a second plumbing pipe 30 (second pipe), a garden hose 26, a water supplying means (outside hose bib 24), a valve unit 22, a spring 48, a bowl 32, a draining means (drain 64), and a pedal 14. The preferred water supplying means includes an outside hose bib 24 located on the side of a house or barn 66. The hose 26 is a conventional garden hose. The hose bib 24 will always be turned to the "on" position. The flexibility and length of the garden hose 26 permits the pet watering fountain 10 to be placed at any convenient location in the back yard.

The ends of the first 28 and second 30 pipes are threaded. The valve unit 22 (body) includes an outwardly directed flange 60 referred to as the lever 20. The inside of the valve unit 22 includes a through passage that extends axially through the valve body 22. The valve unit 22 is of a conventional type whereby the lever 20 manipulates the flow of water. The valve unit 22 includes a lower 68 and upper 70 opening dimensioned and configured to threadingly receive one of the ends of the first 28 and second 30 pipes.

The bowl 32 comprises an upper side portion, a bottom portion, and two openings 72 and 74. The bowl 32 includes an outer lip 76 around the upper side portion of the bowl 32 which is slightly larger than the opening in the top horizontal wall 40 in order for the bowl 32 to sit in the opening. One opening is located in the upper side of the bowl 32 which is dimensioned and configured to receive one end of the second pipe 30. The bottom portion of the bowl 32 has an opening which is dimensioned and configured to receive a draining means 64. The opening 74 connects to a drain 64 which removes the water or contents after periodic cleaning. The bowl 32 can be made of wood, plastic, or metal.

The draining means 64 can be a hose 26 which is routed through an opening in the floor 16 or through an additional opening in a vertical side wall 34 (not shown). The connections leading to the bowl 32 are generously proportioned so when the valve unit 22 is fully opened, the bowl 32 will fill quickly or when the drain 64 is opened, the bowl 32 will empty quickly. The drain means 64 has a stopping means 63 to prevent the water flowing out of the bowl 32. The preferred stopping means is a removable plug 63.

The pet watering fountain 10 components are assembled to promote water flow in the following manner. First, one end of the garden hose 26 is threadingly connected to the threaded portion 80 of the outside hose bib 24 while the other end is threadingly connected to one end of the first pipe 28. The threaded water-tight connection between the garden hose 26 and the first pipe 28 is attached into the opening 46 in the rear vertical wall 38. A lock washer 82 may hold the connection within the opening 46. The other end of the first pipe 28 is threadingly connected to the lower opening 68 of the valve unit 22.

One end of the second pipe 30 is threadingly attached to the upper opening 70 of the valve unit 22 while the other end is connected to the opening 72 in the side portion of the bowl 32. The outer lip 76 of the bowl 32 sits on the opening in the top horizontal wall 40. The end of the draining means 64 is attached to the opening 74 in the bottom portion of the bowl 32 while the other end is attached to an opening in the floor 16.

The pedal 14 sits above the floor 16 with a major portion of the pedal 14 equaling the shape of the portion of the floor 16 that extends outwards. Two flanges 60 extend along the floor 16 of the housing 18 and into the openings 58 in the lower portion 54 of the front vertical wall 36. The middle of each flange 60 includes an opening which receives a fastening means such as a nut, bolt, and washer (not shown) for attaching the lower end 52 of the spring 48. At least one flange 60 includes an opening dimensioned and configured to receive a fastening means such as a nut, bolt, and washer (not shown) for attaching a sturdy wire 84. The flange 60 connected to the sturdy wire 84 would be located nearest to the valve unit 22.

One end of the sturdy wire 84 is attached to the end of the flange 60 nearest to the valve unit 22. The other end of the sturdy wire 84 is attached to the end of a lever 20 which permits manipulation of the control valve unit 22. When the valve unit 22 is closed which stops the flow of water, the lever 20 is in the up position. When the valve unit 22 is open to start the flow of water, the lever 20 is in the down position. The lower end 52 of each spring 48 is attached by a fastening means such as a nut, bolt, and washer (not shown) to the middle of each flange 60. The upper end 50 of the spring 48 is attached by a fastening means such as a nut, bolt, and washer (not shown) to the opening in the center of each side vertical wall 34. All connections where water flows is sealed in a water-tight manner.

The operation of the pet watering fountain 10 is quite simple. Water is dispensed into the bowl 32 by hydraulic pressure which is actuated by a spring-biased pedal 14 and lever mechanism 20 attached to a valve unit 22. First, a thirsty dog walks onto the spring-biased pedal 14. The spring-biased pedal 14 is then lowered to the floor 16 of the housing 18, the sturdy wire 84 attached to the end of the flange 60 pulls the lever 20 in the down position.

As a result, water flows from an outside hose bib 24 into a garden hose 26, through a first pipe 28 into a valve unit 22, then into a second pipe 30 which then fills into an elevated bowl 32 whenever the spring-biased pedal 14 is depressed. When the animal walks off the spring-biased pedal 14, the lever 20 is moved back to its upward position and the water ceases to flow through valve unit 22. When the plug (not shown) in the drain 64 opening is removed, any excess water is drained 64.

The present invention 10 can be adapted to accommodate different sized animals. The spring-biased pedal 14, sturdy wire 48, and lever 20 can be adapted to accommodate the various weights of animals. The present invention 10 could also be easily adapted to accommodate large farm animals, such as cows, horses, hogs, etc. The present invention 10 may be easily dismantled and assembled without any skill or tools for cleaning and repair. The spring 48 being utilized or stretched over long periods of time may lose its ability to fully constrict, therefore the pedal 14 not need to spring back all the way in order for the lever 20 to be in the closed position. Another way to overcome this problem is that in time the springs 48 may have to be replaced.

It is to be understood that the present invention 10 is not limited to the sole embodiment described above, but encompasses any and all embodiments within the scope of the following claims.

We claim:

1. A pet watering fountain connected to a water supplying means, comprising:

a spring having an upper and lower end, said spring having a fastening means at each of said ends of said spring;

a box-shaped housing having two vertical side walls, a front vertical wall, a rear vertical wall, a horizontal floor, and a top horizontal wall, said front vertical wall having an upper and lower portion, said lower portion having two openings, said rear vertical wall having an upper and lower portion, said rear vertical wall having an opening dimensioned and configured to receive said lock washer, at least two-thirds of said horizontal floor extending outwards from said box-shaped housing, the center of said top horizontal wall having an opening, each said vertical side wall having an opening dimensioned and configured to receive a fastening means for attaching said end of said spring;

at least two pipes, a first pipe having each end threaded and a second pipe having each end threaded;

a valve body having at least two openings, each said openings dimensioned and configured to threadingly engage with the threaded end of said first pipe and said second pipe, said valve body including a lever for manipulating the flow of water through said valve body;

a sturdy wire for moving said lever to the upward and downward positions;

a pedal having a major portion of said pedal equaling the shape of the two-third portion of said horizontal floor, said pedal including two flanges extending out the side of said pedal into said box-shape housing through said openings in said lower portion of said front vertical wall, the middle of each said flange having an opening dimensioned and configured to receive said fastening means for the ends of said springs, an end of at least one said flange having an opening dimensioned and configured to receive a fastening means to attach said sturdy wire;

at least one hinge means for attaching said pedal to said horizontal floor, said hinge permitting said pedal when stepped on to move toward said horizontal floor, said hinge permitting said pedal to move upwards by force caused by said springs, a hose having two ends, one end of said hose threadingly connected to a hose bib, the other end of said hose threadingly connected to the end of said first pipe;

a draining means for quickly removing excess water; and a detachably mounted bowl having two openings and an outer lip, one opening dimensioned and configured to receive said draining means, one opening dimensioned and configured to receive the end of said second pipe, said outer lip dimensioned and configured to sit in said opening of said top horizontal wall of said box-shape housing.

2. The pet watering fountain connected to a water supplying means in claim 1, wherein said spring is a helical spring.

3. The pet watering fountain connected to a water supplying means in claim 1, wherein said spring is a tension spring.

4. The pet watering fountain connected to a water supplying means in claim 1, wherein each fastening means includes a nut, bolt and washer.

5. The pet watering fountain connected to a water supplying means in claim 1, wherein said hinge means is a conventional hinge.

6. The pet watering fountain connected to a water supplying means in claim 1, wherein draining means is a drain pipe.

7. The pet watering fountain connected to a water supplying means in claim 1, further comprising a stopping means such as a plug for the drain to hold the water in said bowl.

8. The pet watering fountain connected to a water supplying means in claim 1, wherein said hose is a conventional garden hose.

9. The pet watering fountain connected to a water supplying means in claim 1, wherein said front vertical wall is detachable for cleaning and repairing purposes.

10. The pet watering fountain connected to a water supplying means in claim 1, said detachable mounted bowl is constructed from a material selected from the group consisting of wood, plastic, or metal.

* * * * *